(12) United States Patent
Kaburagi

(10) Patent No.: US 6,837,558 B2
(45) Date of Patent: Jan. 4, 2005

(54) INK-JET PRINTER PERFORMING POWER SOURCE CONTROL, AND CONTROL METHOD OF INK-JET PRINTER

(75) Inventor: Yoshiaki Kaburagi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/234,312

(22) Filed: Sep. 5, 2002

(65) Prior Publication Data
US 2003/0048323 A1 Mar. 13, 2003

(30) Foreign Application Priority Data
Sep. 7, 2001 (JP) ........................ 2001-271815

(51) Int. Cl.$^7$ ................................ B41J 29/38
(52) U.S. Cl. ................. 347/5; 347/19; 347/23
(58) Field of Search ................. 347/5, 9, 19, 23

(56) References Cited

U.S. PATENT DOCUMENTS

| | | | | |
|---|---|---|---|---|
| 4,001,839 A | * | 1/1977 | Kraus | .......................... 347/23 |
| 5,572,242 A | * | 11/1996 | Fujii et al. | ..................... 347/23 |
| 5,631,677 A | * | 5/1997 | Horigome et al. | ............ 347/19 |
| 6,088,128 A | * | 7/2000 | Nishii et al. | ................. 358/434 |

* cited by examiner

*Primary Examiner*—Thinh Nguyen
*Assistant Examiner*—Julian D. Huffman
(74) *Attorney, Agent, or Firm*—Fitzpatrick, Cella, Harper & Scinto

(57) ABSTRACT

An ink-jet printer includes a control circuit for controlling a recording operation by receiving power supply from an AC adapter, a voltage output circuit for outputting a voltage on the basis of a signal output by the AC adapter, and a voltage output control circuit for turning on and off the voltage output circuit. In the printer, in case of starting the power supply from the AC adapter, the voltage output control circuit sets the output of the voltage output circuit to an off state after setting the output to an on state for a certain period of time, whereby it is possible to decrease reactive power while the electronic apparatus is not powered.

10 Claims, 8 Drawing Sheets

INK-JET PRINTER PERFORMING POWER SOURCE CONTROL, AND CONTROL METHOD OF INK-JET PRINTER

BACKGROUND OF THE INVENTION

1. Field of the Invention

The present invention relates to an ink-jet printer and a control method thereof, and more particularly, to an ink-jet printer which can be operated by power supply from, e.g., either a rechargeable secondary battery or a power supply unit of converting a commercial power source into a DC power source, acting as an operation power source, and a power control method thereof.

2. Related Background Art

In recent years, various electronic apparatuses such as a portable personal computer, a portable telephone, a video camera, a portable printer and the like have appeared on the market.

These electronic apparatuses are downsized in consideration of portability, and can be used in a state, i.e., a cordless state, being not connected to a household power source.

Therefore, each of these electronic apparatuses is constituted to be able to be used without connecting it to the household AC power source through a power cord, in such a way that a battery is built into the electronic apparatus or a unit such as a battery pack having a battery built-in is externally connected to the electronic apparatus.

As the power source to be used for these electronic apparatuses, a rechargeable battery, i.e., a so-called secondary battery, is frequently used. Here, as the secondary batteries, a nickel-cadmium battery, a nickel-hydrogen battery, a lithium-ion battery and the like are known.

On one hand, an external power supply unit (generally called an AC adapter) of converting the AC power source into a DC power source can be connected to the electronic apparatus so that it can be operated also based on the AC power source in a house, an office or the like. Also, a current to charge the secondary battery is supplied from the AC adapter.

The secondary battery is generally charged in a case where the AC power source connected to the electronic apparatus is turned on and the electronic apparatus has electric power in reserve because it does not perform high-current driving such as a mechanical operation or the like, or in a case where the electronic apparatus is in a power-off state.

Therefore, even while the electronic apparatus is not powered, if the AC adapter is being connected to the electronic apparatus, it is necessary to be able to automatically charge the secondary battery without any user's operation.

For this reason, in the case where the above electronic apparatus is not powered, the structure to shut off the power from the AC power source to the AC adapter by a mechanical switch is not adopted generally. Instead, even when the electronic apparatus is not powered, the power is supplied to the electronic apparatus to operate a built-in MPU (microprocessor unit), whereby on and off states of the power switch of the electronic apparatus are always detected.

In such a structure, to decrease power consumption while the power switch is turned off, generally, clock frequencies of the MPU and a control circuit for controlling the electronic apparatus are decreased as compared with the case where the power switch is turned on, or the clock frequencies are stopped.

However, in the above conventional case, although the lower consumption as above is achieved, it is still necessary to supply the power to a logic circuit including the MPU of the electronic apparatus, whereby it is not avoided that the electronic apparatus consumes the electric power more than a certain value.

Moreover, the AC adapter consumes the electric power of about 0.3 W to 0.5 W even in an unloaded state that the electronic apparatus is not powered, and the power consumption tends to increase with accelerating speed if the electronic apparatus performs some operation.

Therefore, in order to suppress the power consumption to about 0.5 W and below in the state that an overall system including the AC adapter and the electronic apparatus is not powered, it is necessary to set the power consumption of the electronic apparatus to substantially "0" while it is not powered. If it pays attention to the current state that reactive power while the electronic apparatus is not powered becomes a problem due to recent concern about energy saving and tighter regulations, it is demanded to further decrease the power consumption.

SUMMARY OF THE INVENTION

In order to solve the above problem, an ink-jet printer according to the present invention is the ink-jet printer including a control circuit for controlling a recording operation by receiving power supply from an AC adapter acting as a power supply means, and comprising: a voltage output circuit for outputting a voltage on the basis of a signal output by the power supply means; and a voltage output control circuit for turning on and off the voltage output circuit, wherein, in case of starting the power supply from the AC adapter, the voltage output control circuit sets the output of the voltage output circuit to an off state after setting the output to an on state for a certain period of time.

A control method for the ink-jet printer according to the present invention is the control method for the ink-jet printer which performs the recording operation by receiving the power supply from the AC adapter acting as the power supply means, comprising: a voltage output step of outputting a voltage by the voltage output circuit, on the basis of the signal from the power supply means; an output step of outputting a control signal to turn on and off the voltage output circuit; and a control step of controlling, in case of starting the power supply from the AC adapter, the output step to output the control signal to turn on the voltage output circuit for a certain period of time.

DETAILED DESCRIPTION OF THE PREFERRED EMBODIMENTS

Figure 1:
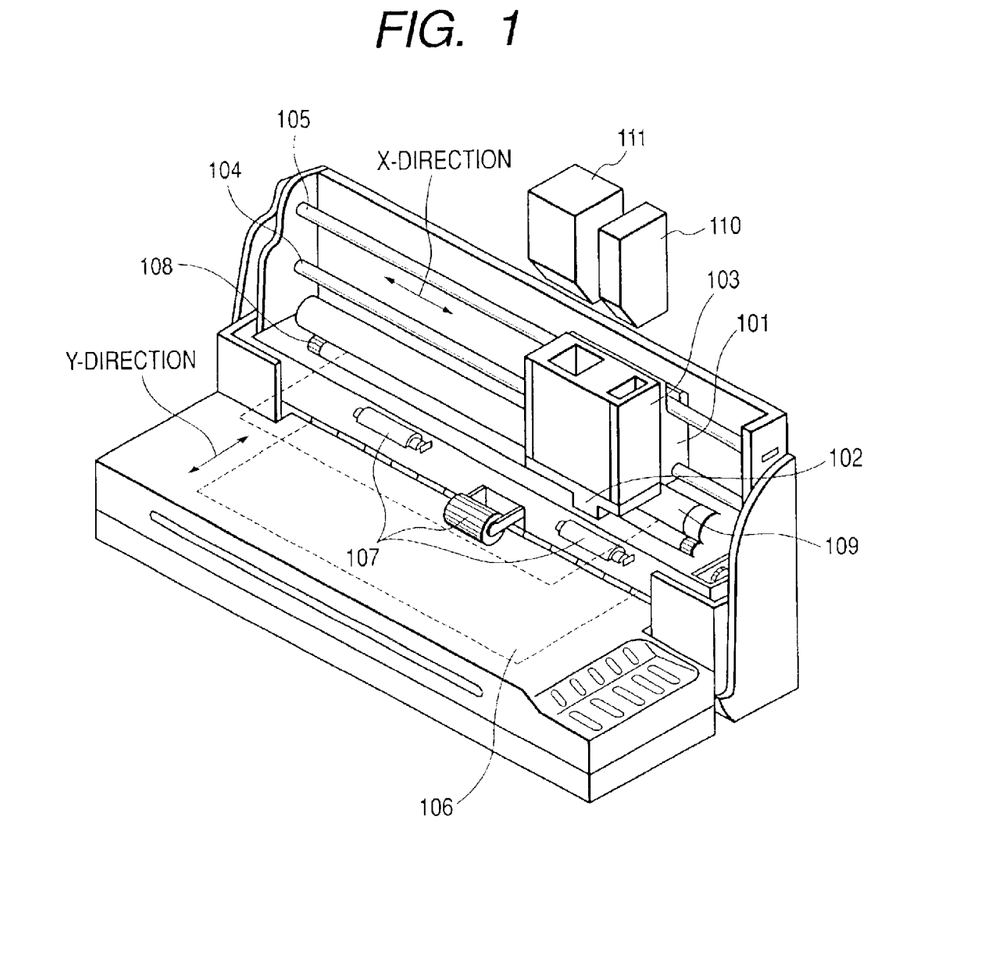
FIG. 1 is a perspective view showing a printer.

FIG. 1 is an external perspective view showing a portable ink-jet printer (hereinafter called a printer) 1 according to the typical embodiment of the present invention. The printer is shown as having the structure capable of performing both color printing and black and white color (monochrome) printing. If the printer is considered as a black and white color (monochrome) printing dedicated device, it has the structure that only an ink cartridge containing black ink explained later is mounted on a recording head.

As shown in FIG. 1, a multi-nozzle recording head 102 having 128 nozzles and a cartridge guide 103 are mounted on a carriage 101, and the recording head 102 discharges a black (K) ink, or cyan (C), magenta (M) and yellow (Y) inks respectively. When the printer performs a recording operation, an ink cartridge 110 containing the black ink and an ink cartridge 111 containing the other three kinds of color inks are being mounted on the recording head 102, whereby the cyan (C), magenta (M), yellow (Y) and black (K) inks are supplied from the respective ink cartridges, and driving signals for the respective nozzles of the recording head 102 are supplied through a flexible cable (not shown) on which numerous conductive wires are arranged.

On one hand, the carriage 101 is mounted on two guide rails 104 and 105, whereby the carriage 101 is reciprocated in the X direction (hereinafter called a main scan direction) according to that an endless belt 109 connected to the carriage 101 is driven by a carrier motor (later described). Moreover, a recording sheet 106 is stretched by auxiliary rollers 107 so that the recording sheet 106 can be smoothly conveyed, and a conveyance roller 108 is driven by a conveyance motor (later described) to feed the recording sheet 106 in the Y direction (hereinafter called a sub scan direction).

Figure 2:
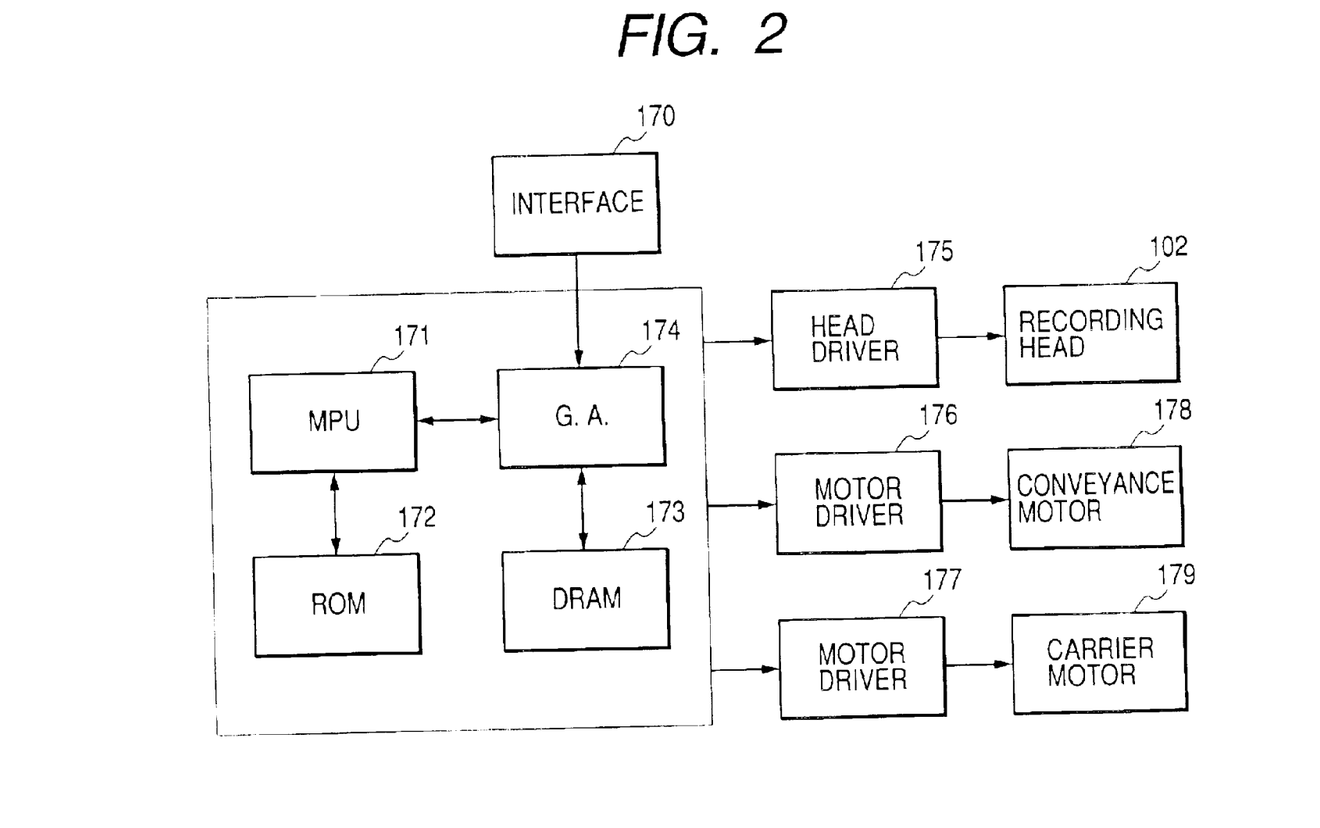
FIG. 2 is a block diagram showing the structure of a control circuit of the printer.

FIG. 2 is a block diagram showing the structure of a control circuit in the printer. In FIG. 2, numeral 170 denotes an interface through which data is input from an external device such as a host computer or the like, numeral 171 denotes an MPU (microprocessor unit), numeral 172 denotes a ROM which stores control programs (including character fonts, if necessary) to be executed by the MPU 171, and numeral 173 denotes a DRAM which temporarily stores various data (control parameters, recording data, etc.). Numeral 174 denotes a gate array (G.A.) which controls recording data supply to the recording head 102 and further controls the data transfer among the interface 170, the MPU 171 and the DRAM 173. Numeral 179 denotes a carrier motor which moves the recording head 102 in the main scan direction, numeral 178 denotes a conveyance motor which conveys the recording sheet, numeral 175 denotes a head driver which drives the recording head 102, and numerals 176 and 177 denote motor drivers which respectively drive the conveyance motor 178 and the carrier motor 179.

Next, the outline of the operation of the above control circuit will be explained. If a recording signal is input to the interface 170, the input recording signal is converted into recording data for printing between the gate array 174 and the MPU 171. Thus, the motor drivers 176 and 177 are respectively driven, and the recording head 102 is driven according to the recording data transferred to the head driver 175, whereby a recording operation is performed.

Here, it should be noted that the portable ink-jet printer is explained as a typical example of the electronic apparatus.

However, in addition to the ink-jet printer, the present invention is applicable to electronic apparatuses such as a laptop personal computer, a palmtop personal computer, a digital video camera, an Internet-accessible personal digital assistance and the like capable of operating by the secondary battery or the AC power source.

<First Embodiment>

Figure 3:
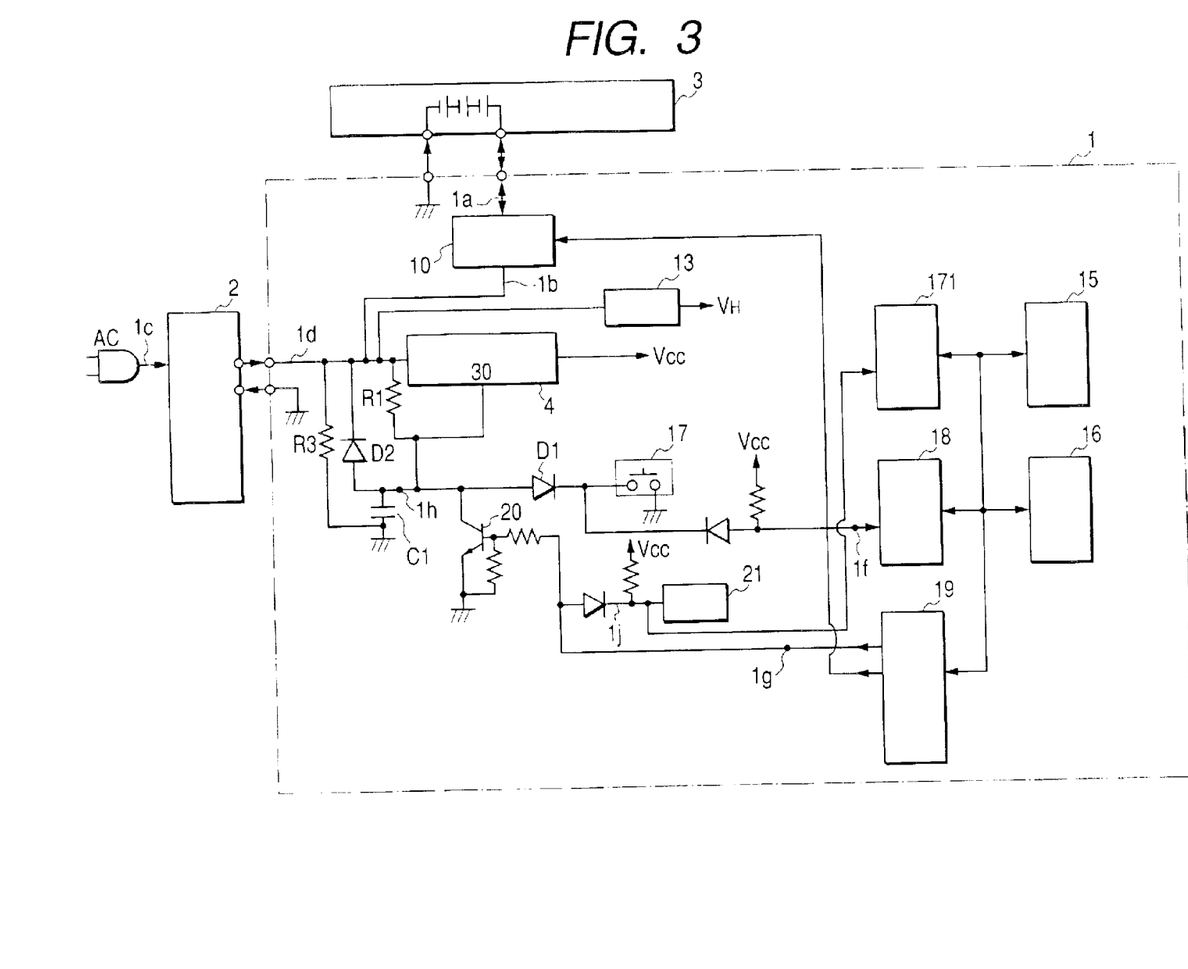
FIG. 3 is a block diagram showing the structure of a power supply unit of the printer according to the first embodiment.

FIG. 3 is a block diagram showing the detailed structure of a control unit 1 of the printer (also called the printer 1 hereinafter).

Numeral 2 denotes an AC adapter which converts an AC power source from a household outlet or the like into a DC power source and supplies power to the control unit 1 of the printer, and numeral 3 denotes a secondary battery which supplies power to the control unit 1 of the printer. When only the secondary battery 3 is connected to the printer, the power is supplied to the control unit 1 through a line 1a, a charging control circuit 10 and a line 1b in due order.

On one hand, when the AC adapter 2 is connected to the control unit 1 of the printer, the power is supplied from the AC adapter 2 irrespective of whether or not the secondary battery 3 is connected. That is, an AC voltage from an AC power source 1c is converted into a DC voltage by the AC adapter 2, and the converted DC voltage is input through a line 1d. In the present embodiment, it is assumed that the DC voltage has the value of, e.g., 16V. The voltage supplied from the secondary battery 3 or the AC adapter 2 through the line 1d is stepped down to a predetermined voltage (e.g., 5V) by a DC-DC converter 4, and the stepped-down voltage is supplied as a logic operation voltage $V_{CC}$ of the control unit 1 of the printer.

The voltage supplied from the secondary battery 3 or the AC adapter 2 through the line 1d is likewise input to a DC-DC converter 13 and stepped up to a predetermined voltage (e.g., 19V), and the stepped-up voltage is supplied as a driving voltage $V_H$ for the motor and the recording head of the printer.

In a case where the secondary battery 3 is connected and not in a full-charged state, and there is room in the power consumption of the printer, the battery is charged through the AC adapter 2 and the charging control circuit 10.

Here, it should be noted that the secondary battery is a rechargeable battery of Ni—Cd system, lithium-hydrogen system of the like such as a nickel-cadmium battery, a nickel-hydrogen battery, a lithium-ion battery or the like.

Next, the structure of the printer 1 and an on/off sequence of the power source will be explained in detail with reference to FIGS. 4 and 5 being the timing charts of the main signals shown in FIG. 3.

As shown in FIG. 3, a power switch 17 for turning on/off the printer is provided in the control unit 1 of the printer, and an output signal if from the power switch 17 is read by the MPU 171 through an input port 18, and it is controlled based on an output signal 1g from an output port 19 to turn on/off a transistor 20.

First, if the AC adapter 2 is connected to the printer 1 in the state that it is connected to the outlet of the AC power source, the input voltage rises on the line 1d (of course, the input voltage rises on the line 1d even if the AC adapter is connected to the outlet of the AC power source in the state it is connected to the control unit 1 of the printer). Here, since the power switch 17 is not depressed, the printer is in the state that the power source is not turned on based on the on state of the power switch.

The signal on the line 1d is input to the DC-DC converter 4, and the line 1d is connected to one end of a resistor R1. The other end of the resistor R1 is connected to an output control terminal 30 of the DC-DC converter 4, and a capacitor C1 is inserted between the resistor R1 and the ground.

The output control terminal 30 of the DC-DC converter 4 comes to be in a state of capable of oscillating at "L" level, and the logic operation voltage $V_{CC}$ comes to be in an output state. On the other hand, the output control terminal 30 comes to be in a state of incapable of oscillating at "H" level, and the logic operation voltage $V_{CC}$ comes to be in an output-off state.

An integration circuit is composed by the resistor R1 and the capacitor C1, and an input signal 1*h* of the output control terminal 30 of the DC-DC converter 4 gradually rises from 0V at a time constant determined according to the resistor R1 and the capacitor C1.

After the DC voltage on the line 1*d* rose, the input signal 1*h* of the output control terminal 30 is recognized as "L" level for a certain period of time, whereby the power is supplied from the DC-DC converter 4 to the logic circuit including the MPU while the signal is being "L" level.

Figure 4:
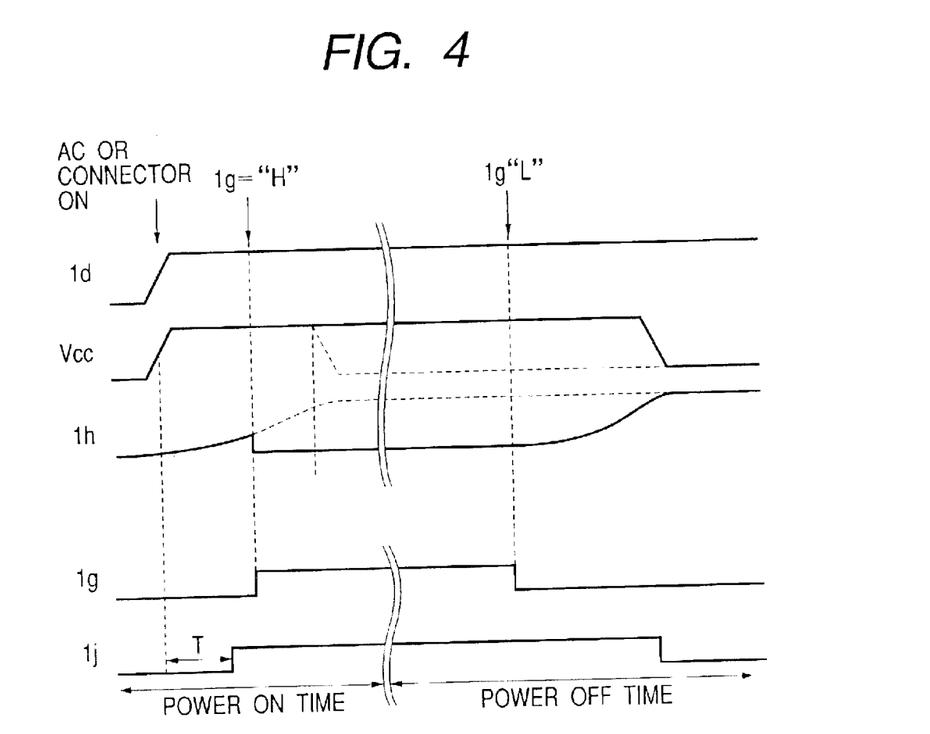
FIG. 4 is a timing chart showing main signals of the control circuit when an AC adapter is connected.

After then, as shown in FIG. 4, since the input signal 1*h* of the output control terminal 30 is recognized as "H" level when it comes to have a regulated voltage or more, the DC-DC converter 4 stops oscillating, whereby the output voltage $V_{CC}$ from the DC-DC converter 4 becomes 0V.

Therefore, before the output control terminal 30 is recognized as "H" level, the MPU 171 of which the reset state is released by receiving the power supply outputs the signal 1*g* of "H" level from the output port 19 to turn on the transistor 20, whereby the output control terminal is set as "L" level, and the operation state of the MPU 171 is maintained.

After then, the MPU 171 checks through the charging control circuit 10 whether or not it is necessary to charge the secondary battery 3. This check is performed by flowing the charging current to the secondary battery and measuring the value of the flown current. If it is necessary to charge the secondary battery 3, a current of predetermined magnitude flows, while if it is unnecessary to charge the battery, only a little current flows.

If it is unnecessary to charge the secondary battery 3 because it is in the full-charged state, the MPU 171 outputs the signal 1*g* of "L" level from the output port 19 to turn off the transistor 20. Then, if the transistor 20 is turned off, the potential 1*h* increases according to a time constant of the integration circuit composed of the resistor R1 and the capacitor C1, and the DC-DC converter 4 stops oscillating at the time when the output control terminal 30 comes to have the regulated voltage or more. As a result, the output voltage $V_{CC}$ becomes 0V, and the logic circuit stops operating, whereby the power consumption of the printer becomes approximately zero.

Incidentally, in FIG. 3, a diode D2 and a resistor R3 together function to discharge electrical charges on the capacitor C1 through the line of the plus terminal of the capacitor C1→the diode D2→the resistor R3→the minus terminal of the capacitor C1, when the output connector of the external supply unit (AC adapter) 2 is pulled out.

Moreover, this discharge circuit can connect the cathode of the diode D2 to the output $V_{CC}$ being the output line of the DC-DC converter 4 without using the resistor R3, and thus discharge the electrical charges by using an impedance of the device.

Next, the circuit operation that a user depresses the power switch 17 in this state to again supply the power to the printer and operate it will be explained with reference to the timing chart shown in FIG. 5.

Figure 5:
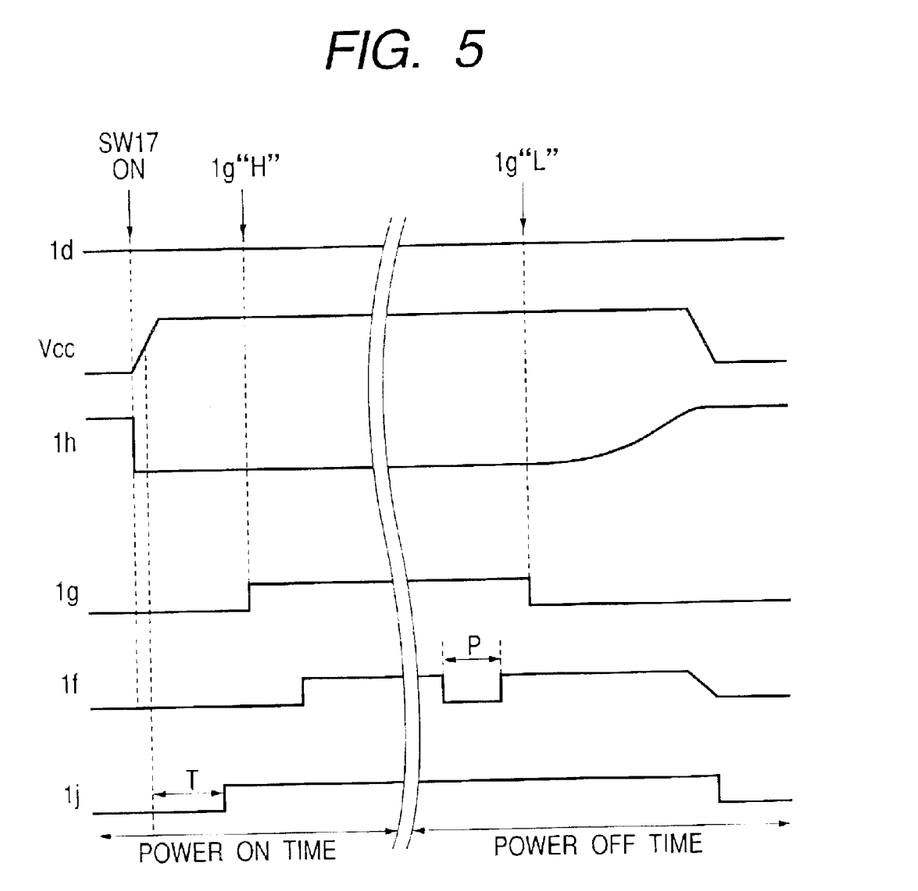
FIG. 5 is a timing chart showing the main signals of the control circuit when a power switch is turned on and off.

Before the start (i.e., the depression of the power switch 17) of the timing chart shown in FIG. 5, although the power is supplied from the AC adapter up to the line 1*d*, the DC-DC converter 4 stops oscillating, whereby the logic circuit does not operate because the output voltage $V_{CC}$ is 0V.

In this state, if the user depresses the power switch 17 to operate the printer, the potential on the signal line 1*h* becomes about 0.6V through a diode D1 because one end of the power switch 17 is grounded. Thus, the output control terminal 30 is recognized as "L" level, the DC-DC converter 4 starts oscillating, and the logic voltage $V_{CC}$ is supplied to the logic circuit including the MPU 171.

Then, if the logic power source voltage $V_{CC}$ becomes a certain level or more, a reset circuit 21 outputs a rest signal 1*j* of "L" level for a predetermined period of time T (about 100 msec) to reset the MPU 171. After this reset operation ends and the reset is released, the MPU 171 executes the control program stored in the ROM 172 to control the printer 1.

In the initial control according to the control program stored in the ROM 172, the output port 19 outputs the signal 1*g* of "H" level to turn on the transistor 20. By this operation, since the potential of the signal 1*h* is maintained as "L" level after the depression of the power switch 17 ends, the DC-DC converter 4 comes to be in the output state, and the state that the power is supplied is maintained, whereby the printer 1 comes to be in the operation state.

Next, a circuit operation from the operation state of the printer 1, i.e., the state that the power is being supplied from the AC adapter 2 to the internal circuit of the printer 1 through the DC-DC converter 4, to the state that the power supply to the printer 1 is interrupted by the depression of the power switch 17 and thus the printer 1 comes to be in the power off state will be explained.

First, in the state that the power is supplied from the power supply unit (AC adapter) 2 to the printer 1, the potential of the signal 1*h* is maintained as about 0.6V because the transistor 20 is kept on through the output port 19 as described above.

In this state, if the power switch 17 is depressed and subsequently released, a pulse P as shown in FIG. 5 is output to the power switch output signal i*f* and then input to the input port 18.

On one hand, if it is detected through the input port 18 that the power switch 17 is depressed, then the MPU 171 starts a power off sequence. In the power off sequence, the MPU 171 first changes the level of the output signal 1*g* of the output port 19 to "L" level, whereby the transistor 20 comes to be in the off state. Thus, the potential of the signal line 1*h* becomes "H" level, the DC-Dc converter 4 stops oscillating, and the logic power source voltage $V_{CC}$ decreases.

Then, if the logic power source voltage $V_{CC}$ becomes a certain level or less, the output of the reset circuit 21, i.e., the signal 1*j*, becomes "L" level. As a result, it is possible to prevent an erroneous operation of the transistor 20 due to that the output signal of the output port 19 becomes unstable.

Figure 6:
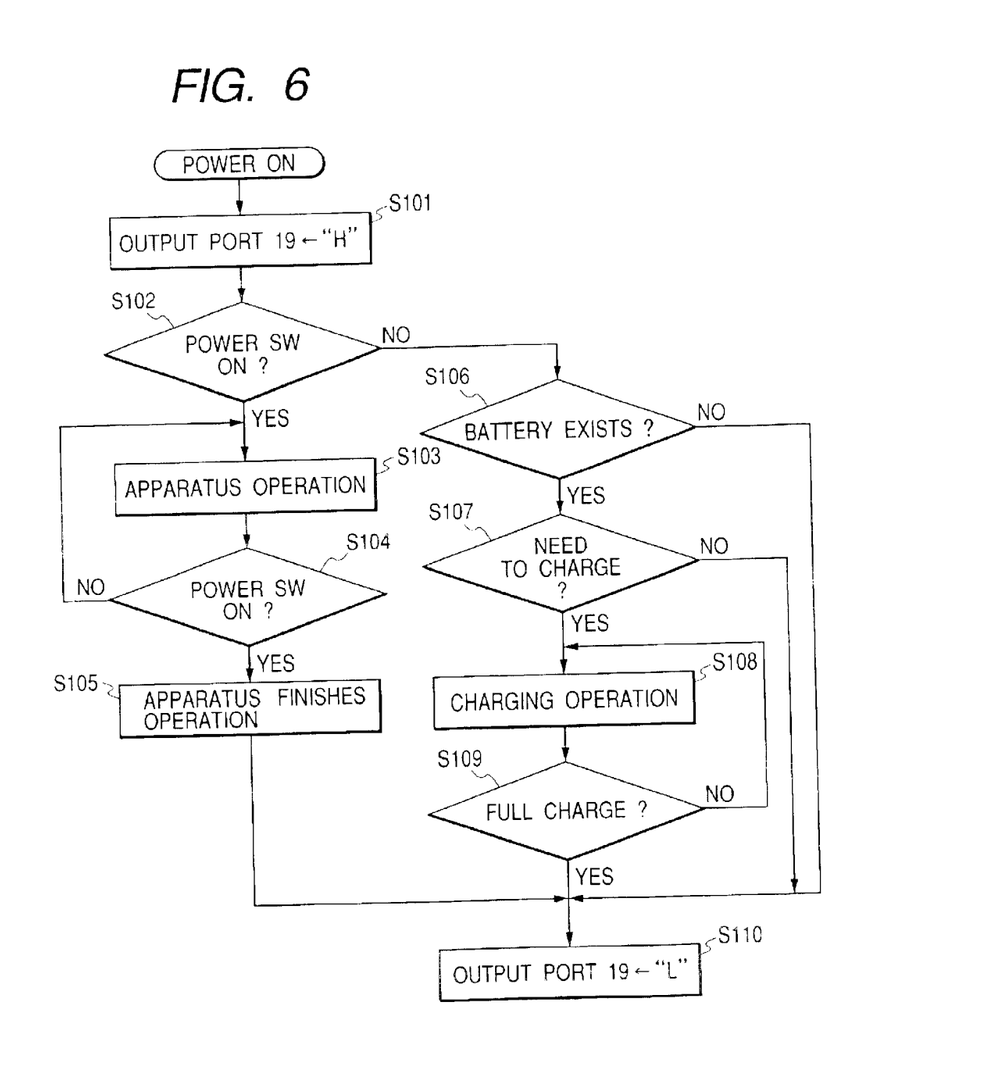
FIG. 6 is a flow chart showing a control procedure of an MPU according to the first embodiment.

Hereinafter, a control procedure to be performed by the MPU 171 when the power source of the printer 1 is turned on/off will be explained with reference to the flow chart shown in FIG. 6.

As described above, in the present embodiment, it is assumed that the power switch 17 is depressed by the user to operate the printer 1, the logic voltage $V_{CC}$ is resultingly supplied to the logic circuit including the MPU 171 of the printer, the power source voltage is supplied to the printer 1, and the reset is released after elapsing the regulated period of time T after the voltage is applied to the logic circuit including the MPU 171. Thus, the MPU 171 starts the control according to the program stored in the ROM 172.

After the reset is released, in a step S101, the signal of "H" level is first output to the output port 19 to turn on the transistor 20, whereby the oscillation state of the DC-DC converter 4 is maintained, and the power is continuously supplied from the AC adapter 2.

Next, in a step S102, the output signal 1f to the input port 18 is read to check whether or not the power switch 17 of the printer 1 is depressed. If the power switch 17 is not depressed, it is considered that the AC adapter 2 is only connected to the printer 1 but the user does not wish to start the printer, whereby the step advances to a step S106.

Then, it is checked in the step S106 whether or not the secondary battery is connected. It should be noted that this check can be performed by measuring the terminal voltage of the connection unit to the secondary battery. Then, it is checked in a step S107 whether it is necessary to charge the secondary battery. If it is considered in the step S106 that the secondary battery is not mounted or if it is checked in the step S107 that it is unnecessary to charge the secondary battery even if it is mounted, the flow advances to a step S110.

On the other hand, if it is considered that the secondary battery is mounted and it is necessary to charge the secondary battery, the flow advances to a step S108 to perform the charging until the battery comes to be in the full-charged state, as checking in a step S109 whether the battery comes to be in the full-charged state.

In the step S110, the signal of "L" level is output to the output port 19 to turn off the transistor 20, whereby the DC-DC converter 4 stops oscillating. As a result, the voltage $V_{CC}$ becomes 0V, and the MPU 171 stops operating.

On the other hand, if it is considered in the step S102 that the power switch 17 is depressed, the printer is operated in a step S103. Here, the printer first performs an initialization operation when the power source is turned on. For example, the printer performs a recovery operation of the recording head to set the state that the recording head can satisfactorily discharge inks. Moreover, as the initialization operation, the printer starts communication with the host apparatus such as the personal computer or the like. Then, the printer receives and records the data sent from the personal computer, and performs the recovery operation of the recording head between the recording operations according to need.

While the printer is operating, the state of the power switch 17 is always checked by polling or interrupt in a step S104. If it is considered in the step S104 that the power switch 17 is depressed during the operation of the printer, the flow advances to a step S105 to end the currently performed operation of the printer, and the flow further advances to the step S110 to interrupt the power supply from the AC adapter 2.

As explained above, when the AC adapter is connected to the outlet of the AC power source, the DC-DC converter 4 is turned on for a certain period of time to supply the power to the printer even if the power switch is not turned on, whereby the MPU can operate. Thus, it is possible to check the state of the secondary battery and to charge the secondary battery if necessary. If the charging is unnecessary or completed, the MPU stops operating, the DC-DC converter 4 is turned off, and the printer is on standby until the power switch is turned on, whereby the power consumption of the printer system becomes zero.

<Second Embodiment>

Figure 7:
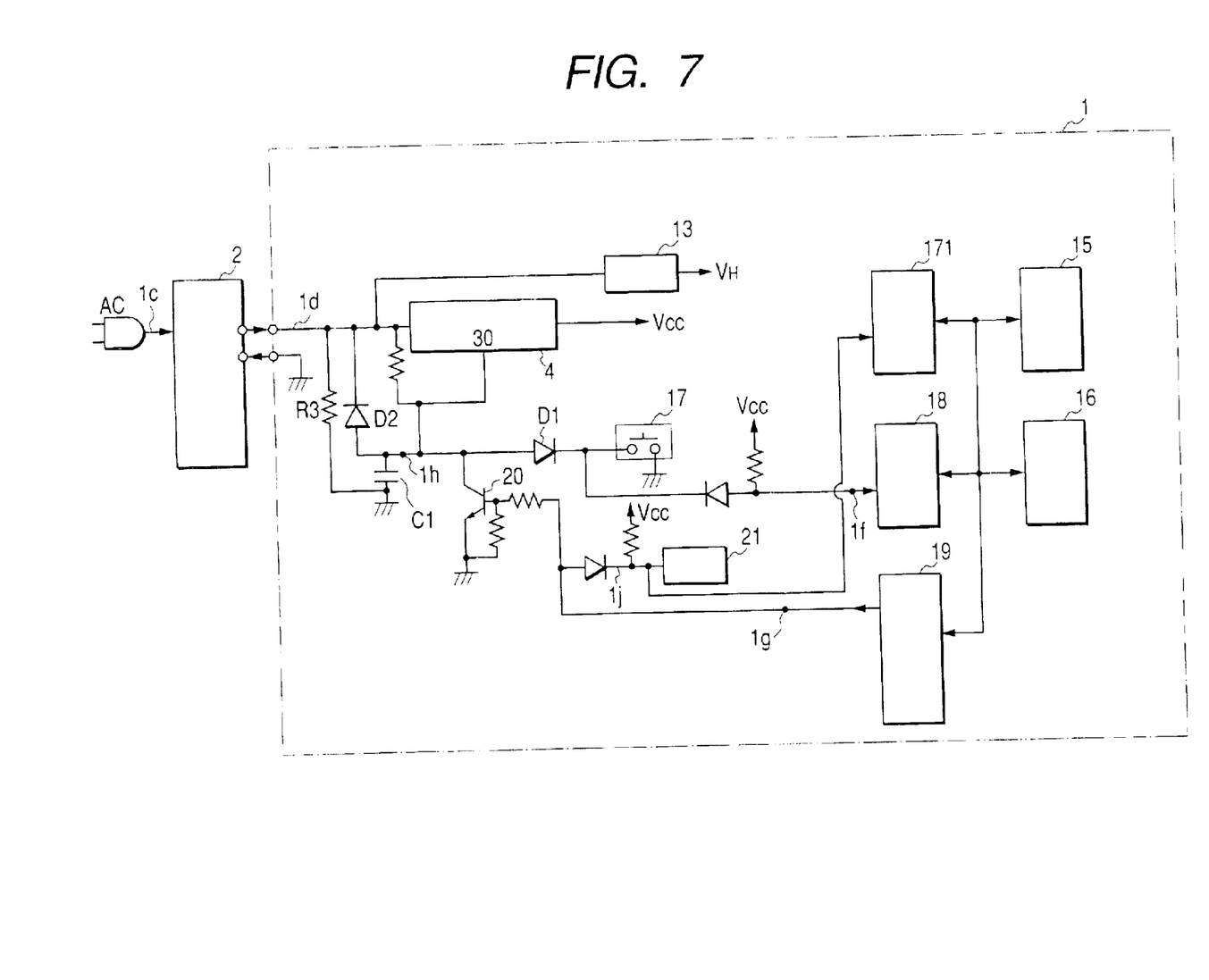
FIG. 7 is a block diagram showing the structure of a power supply unit of the printer according to the second embodiment.

FIG. 7 is a block diagram showing the detailed structure of a power supply unit of a printer 1. The structure in the present embodiment differs from the structure of FIG. 3 explained in the first embodiment in the point that there is no secondary battery and no charging circuit for the secondary battery, that is, other portions in the present embodiment are the same as those in the first embodiment.

Therefore, since the sequence to turn on/off the power source in the present embodiment is the same as that in the first embodiment, the explanation of main signals will be omitted.

Figure 8:
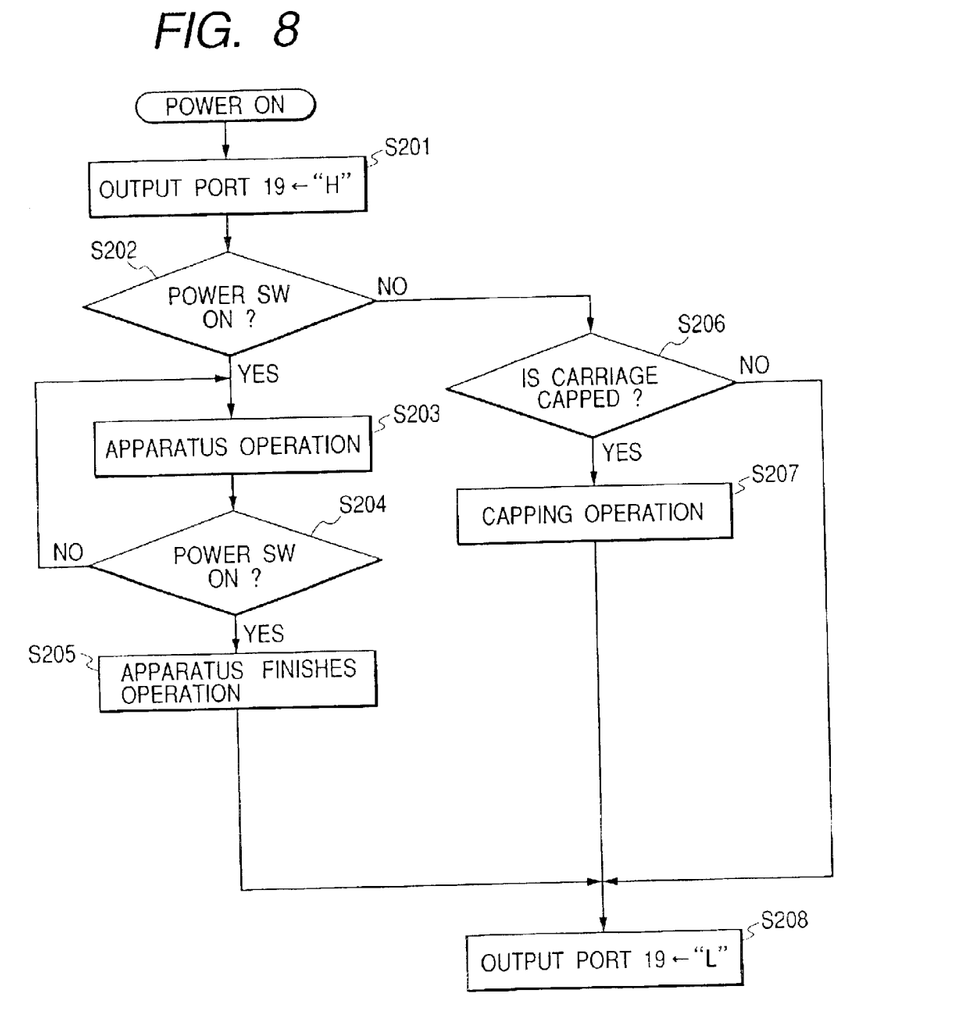
FIG. 8 is a flow chart showing a control procedure of an MPU according to the second embodiment.

Then, a control procedure to be executed by an MPU 171 when the power source of the printer 1 is turned on/off will be explained with reference to a flow chart shown in FIG. 8.

After the reset is released, in a step S201, a signal of "H" level is first output to an output port 19 to turn on a transistor 20, whereby the oscillation state of a DC-DC converter 4 is maintained, and the power is continuously supplied from an AC adapter 2.

Next, in a step S202, an output signal 1f to an input port 18 is read to check whether or not a power switch 17 of the printer 1 is depressed. If the power switch 17 is not depressed, it is considered that the AC adapter 2 is only connected to the printer 1 but a user does not wish to start the printer, whereby the step advances to a step S206.

Then, it is checked in the step S206 whether or not a carriage is capped. It should be noted that this check is performed by a position sensor (not shown) on the carriage. Then, if the carriage is capped, the flow advances to a step S208, while if the carriage is not capped, a capping operation to move the carriage to a capping position is performed in a step S207. The capping is not only to protect the surface of the recording head but also to be able to prevent the ink from flowing out of a not-shown ink tank (including a waste ink tank) of the portable printer, whereby it is very effective.

Incidentally, when the capping operation is performed, recovery operations such as a preliminary discharging operation, a wiping operation and the like to protect the surface of the recording head are performed according to need.

In the step S208, the signal of "L" level is output to the output port 19 to turn off the transistor 20, whereby the DC-DC converter 4 stops oscillating. As a result, a voltage $V_{CC}$ becomes 0V, and the MPU 171 stops operating.

On the other hand, if it is considered in the step S202 that the power switch 17 is depressed, the printer is operated in a step S203. Here, the printer first performs an initialization operation when the power source is turned on. For example, the printer performs a recovery operation of the recording head to set the state that the recording head can satisfactorily discharge inks. Moreover, as the initialization operation, the printer starts communication with the host apparatus such as a personal computer or the like. Then, the printer receives and records the data sent from the personal computer, and performs the recovery operation of the recording head between the recording operations according to need.

While the printer is operating, the state of the power switch 17 is always checked by polling or interrupt in a step S204. If it is considered in the step S204 that the power switch 17 is depressed during the operation of the printer, the flow advances to a step S205 to end the currently performed operation of the printer, and the flow further advances to the step S208 to interrupt the power supply from the AC adapter 2.

As explained above, when the AC adapter is connected to the outlet of the AC power source, the DC-DC converter 4 is turned on for a certain period of time to supply the power to the printer, whereby the MPU can operate. Thus, it is checked whether or not the recording head is capped, and the capping operation is performed if necessary. If the capping operation is unnecessary, the MPU stops operating, and the DC-DC converter 4 is turned off, whereby the power consumption of the printer system becomes zero. As above, in the first and second embodiments, although the integration circuit composed by the resistor R1 and the capacitor C1 is described as the example of the way to turn on the step-down circuit for the certain period of time when the AC adapter is connected and when the printer is connected to the AC outlet, it is possible to achieve the same function by using a differentiating circuit.

Moreover, in the embodiments, the tact switch having the structure to be on in the case where the switch is being depressed is explained by way of example of the power switch for operating the printer. However, the present invention is not limited to this, that is, other type of switch such as a slide switch or the like is applicable.

Moreover, in the embodiments, the DC-DC converter is described by way of example of the step-down circuit for generating the logic voltage. However, it is apparent that a voltage regulator (often called a three-terminal regulator, in general) having output control terminals can be used.

Moreover, as the method of judging whether or not it is necessary to charge the secondary battery, the method of performing the judgment based on the value of the charging current is described, but other method is applicable. For example, if there is information concerning the charging to the secondary battery, a method of performing the judgment based on this information is applicable.

Moreover, the regulated period of time T of the reset signal in the reset circuit is 100 msec. However, other value is applicable if it satisfies the control according to the embodiments. Besides, the output value of the AC adapter is 16 V, other voltage value is applicable.

According to the present invention, it is possible to suppress the power consumption of the ink-jet printer to approximately zero when the printer is being turned off, whereby there is an effect of enabling to provide the apparatus that the power consumption of the overall ink-jet printer including the power supply unit is extremely small.

Moreover, even if the power source of the ink-jet printer is in the off state, it is possible, without user's operation, to perform the process only by connecting the AC adapter.

What is claimed is:

1. An ink-jet printer which includes a recording control circuit for controlling a recording operation, comprising:
   a voltage output circuit which receives power from an AC adapter and which is controllable via a terminal between an on-state for outputting a voltage and an off-state for not outputting the voltage; and
   a voltage output control circuit responsive to an output signal from said recording control circuit for outputting a corresponding signal to said terminal instructing the on-state or the off-state of said voltage output circuit,
   wherein, immediately after the initial supply of power to said voltage output circuit from said AC adapter, said voltage output circuit automatically becomes said on-state for a certain period of time corresponding to a time constant of said voltage output control circuit, and
   wherein said recording control circuit outputs an output signal to said voltage output control circuit such that said voltage output control circuit outputs a signal to said voltage output circuit to maintain the on-state, judges during the maintained on-state whether to cause said printer to perform a predetermined operation during said certain period of time, and outputs an output signal to said voltage output control circuit such that said voltage output control circuit outputs a signal to said voltage output circuit to become the off-state if said recording control circuit does not cause said printer to perform said predetermined operation.

2. An ink-jet printer according to claim 1, wherein said ink-jet printer operates by receiving a supply of power from a secondary battery, and includes a charging control circuit for charging said secondary battery.

3. An ink-jet printer according to claim 2, wherein said predetermined operation is to charge said secondary battery by said charging control circuit.

4. An ink-jet printer according to claim 1, wherein said printer performs a recording operation by using a recording head, and said predetermined operation is a recovery operation of said recording head.

5. An ink-jet printer according to claim 4, wherein said recording head contains plural recording elements including an electrothermal converter for generating thermal energy as energy to discharge ink.

6. An ink-jet printer according to claim 1, wherein said voltage output circuit is a DC-DC converter or a voltage regulator.

7. An ink-jet printer according to claim 1, wherein said voltage output control circuit includes an RC-type circuit constituted by a capacitor and a resistor element, the time constant corresponding to that of the RC-type circuit.

8. An ink-jet printer according to claim 7, wherein a terminal potential of said capacitor is connected to the terminal of said voltage output circuit.

9. An ink-jet printer according to claim 7, wherein said voltage output control circuit includes switch means and sets the switch means to a closed state in accordance with the output signal from said recording control circuit to discharge a charge charged in said capacitor.

10. An ink-jet printer operating by receiving power supply from a commercial power source through an AC adapter, comprising:
   a voltage output circuit including a terminal for inputting a signal instructing ON or OFF, the voltage output circuit having an on-state outputting a predetermined voltage based on a power supplied from said AC adapter in a case where the signal instructs ON, and an off-state stopping output of said predetermined voltage even if power is supplied from said AC adapter in a case where the signal instructs OFF;
   a voltage output control circuit having a first signal line which switchably connects switch means between said terminal and ground, a second signal line connecting a power switch between said terminal and ground, and an RC-type circuit constituted by a resistor element and a capacitor, the RC-type circuit being connected between said AC adaptor and said terminal so that a terminal voltage of said capacitor is input to said terminal; and
   a recording control circuit for controlling said ink-jet printer, said recording control circuit being energized by said predetermined voltage from said voltage output circuit, the recording control circuit including an input port for reading the terminal voltage of said capacitor and an output port for outputting an output signal for changeover between an open and close of said switch means.

* * * * *

UNITED STATES PATENT AND TRADEMARK OFFICE
CERTIFICATE OF CORRECTION

PATENT NO.    : 6,837,558 B2
DATED         : January 4, 2005
INVENTOR(S)   : Kaburagi It is certified that error appears in the above-identified patent and that said Letters Patent is hereby corrected as shown below:

Column 4,
Line 52, "if" should read -- 1f --.

Column 6,
Line 42, "if" should read -- 1f --.

Column 9,
Line 55, "after the" should read -- after an --.

Signed and Sealed this

Eighteenth Day of October, 2005

JON W. DUDAS
*Director of the United States Patent and Trademark Office*